May 26, 1925.
B. NOBLE
1,539,691
CENTRIFUGAL CASTING MACHINE
Filed July 19, 1922
3 Sheets-Sheet 1
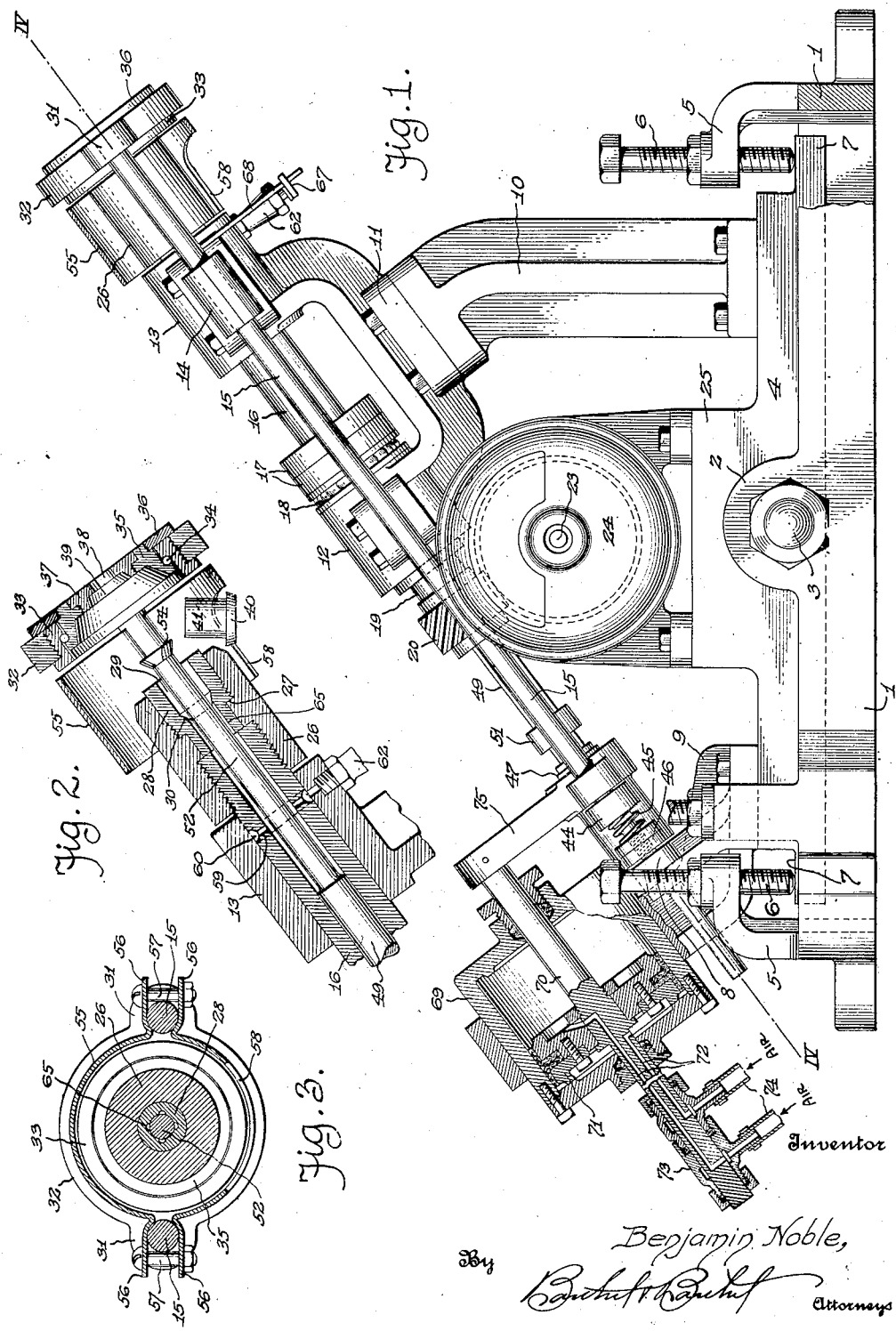
Inventor
Benjamin Noble,
By
Attorneys

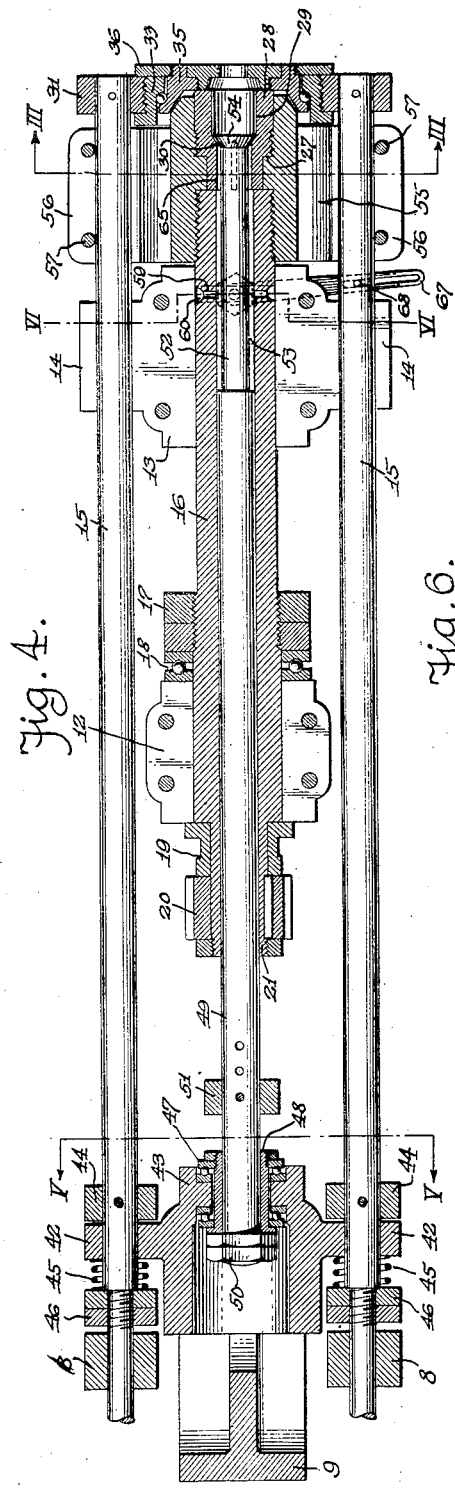

May 26, 1925. 1,539,691
B. NOBLE
CENTRIFUGAL CASTING MACHINE
Filed July 19, 1922  3 Sheets-Sheet 3

Inventor
Benjamin Noble,
By
Attorneys

Patented May 26, 1925.

1,539,691

UNITED STATES PATENT OFFICE.

BENJAMIN NOBLE, OF DETROIT, MICHIGAN, ASSIGNOR TO CAPITOL BRASS WORKS, OF DETROIT, MICHIGAN, A CORPORATION OF MICHIGAN.

CENTRIFUGAL CASTING MACHINE.

Application filed July 19, 1922. Serial No. 576,025.

*To all whom it may concern:*

Be it known that I, BENJAMIN NOBLE, a citizen of the United States of America, residing at Detroit, in the county of Wayne and State of Michigan, have invented certain new and useful Improvements in Centrifugal Casting Machines, of which the following is a specification, reference being had therein to the accompanying drawings.

This invention relates to a centrifugal casting machine and has special reference to that class of automatic machines for casting hollow articles, generally, in which the interior cavity or bore is in the form of a cylinder, cone or frustum of a cone irrespective of the configuration imparted to the exterior of the article by the mold. As an instance of such hollow articles, I may mention cast iron pipes, sleeves, bushings, liners, piston rings and various kinds of annular straight or offset articles.

My invention aims to provide a machine of the above class which will possess the following characteristics:—

First, the machine embodies a motor driven rotary mold in which a mass of temporarily plastic or molten material may be placed to have rotation imparted thereto, thereby subjecting the mass to the action of centrifugal force, so that the plastic or molten material will be uniformly distributed throughout the mold and, particularly into any offset portion thereof. Associated with the rotary mold is a gate or end mold of novel design in which an offset portion of an article may be advantageously molded, and provision is made for automatically shifting the gate or end mold relative to the main mold, so that the operator or attendant of the machine is free to charge the mold as fast as the articles are removed therefrom.

Second, a machine in accordance with my invention embodies an article ejector and utilizes air, under pressure, for actuating the ejector and for producing a blast in the mold of the machine to remove foreign matter that may interfere with the exterior finish or configuration of an article molded by the machine. The shifting of the mold gate is in timed relation to the operation of the article ejector, and such operations are carried on without a cessation in the rotation of the mold.

Third, the mold and its appurtenant parts are mounted for angular adjustment relative to a substantial machine base or bed and it is by virtue of such adjustment that the mold may be placed at a desired inclination for producing articles of desired dimensions and configurations according to the nature of the plastic or molten material to be shaped and have solidity imparted thereto.

Fourth, my invention further includes an adjustable guard for a continuous operating mold from which complete articles may be intermittently ejected, the guard preventing the articles from being thrown in all directions by centrifugal force and preventing an attendant or operator of the machine from being injured by such articles.

Fifth, the machine possesses certain novel details of construction which obviate the necessity of using a water cooling system for the mold, which compensate for expansion and contraction of those parts of the machine subjected to high temperatures, which prevent jamming or sticking of movable parts of the machine, which eliminate friction and inaccuracies or imperfections in the articles produced by the machine, and which permit of the machine parts being readily assembled, manufactured at a comparatively small cost, and as a whole operated and controlled at a minimum expense.

Other features of my invention will hereinafter appear as the construction of the machine is described by the aid of the drawings, wherein—

Figure 1 is a side elevation of the automatic centrifugal casting machine, partly broken away and partly in section;

Fig. 2 is an enlarged longitudinal sectional view of the rotary mold of the machine, its gate and guard, showing the position of the gate during the ejection of an article;

Fig. 3 is an enlarged cross sectional view taken on the line III—III of the following figure;

Fig. 4 is an enlarged longitudinal sectional view taken on the line IV—IV of Fig. 1;

Fig. 5 is an enlarged cross sectional view taken on the line V—V of Fig. 4;

Fig. 6 is an enlarged cross sectional view taken on the line VI—VI of Fig. 4;

Fig. 7 is a longitudinal sectional view of a portion of the rotary mold showing the gate thereof in a closed position, and an article in the mold.

Figure 8:
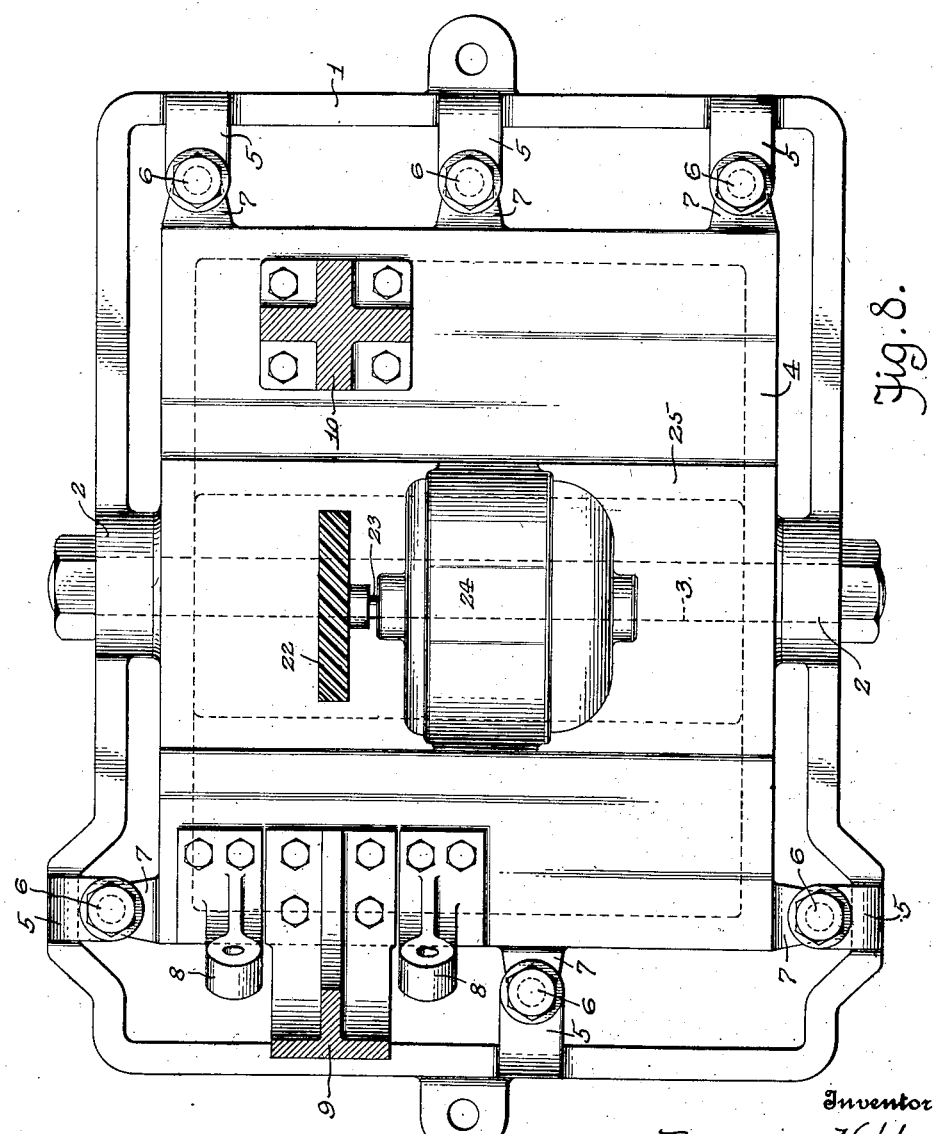
Fig. 8 is a plan of the base or bed of the molding machine with certain uprights or pedestals thereof in a horizontal section.

Reference will first be had to Figs. 1 and 8 showing a substantially rectangular frame 1 that may be suitably mounted on a foundation or other support and the side walls of said frame have opposed apertured ears or bearings 2 for a transversely disposed trunnion or pivot 3 supporting a tiltable machine bed or platform 4, which is also substantially rectangular and is partially housed within the frame 1. The trunnion or pivot 3 may be conveniently in the form of transversely disposed tie rods or nut equipped bolt.

On the end and side walls of the frame 1 are a plurality of overhanging brackets 5 provided with set screws or bolts 6 having the lower ends thereof engaging laterally extending lugs 7 carried by end and side walls of the machine bed 4, and by adjusting the set screws 6, the machine bed may be tilted on its trunnion or pivot to a desired inclination and it is this angular adjustment of the machine bed which will permit of articles of various sizes being produced from various kinds of plastic and molten materials.

On what may be conveniently considered the rear end of the machine bed 4 is a set of guides 8 and an intermediate pedestal 9, said guides and pedestal being disposed at an obtuse angle to the greater part of the machine bed so that the longitudinal axes of said guides and pedestal will be disposed at an acute angle relative to the greater part of the machine bed.

On the forward end of the machine bed 4 is an upright or pedestal 10 longitudinally alining with the pedestal 9 and mounted on the upper end of the pedestal 10 is an angularly disposed bifurcated member 11 provided with bearings 12 and 13, said bearings having the axes thereof co-axial relative to each other and the axis of the pedestal 9. On the sides of the bearing 13 are guides 14 for a set of reciprocatory guide rods 15 which also serve as supports, said rods being slidable in the guides 8.

Journaled in the bearing 12 is a rotary tubular mold support 16 and mounted on said support, at the upper end of the bearing 15, is an abutment 17. Interposed between this abutment and the end of the bearing 12 is an anti-frictional end thrust bearing 18. At the lower or opposite end of the bearing 12 is a spacing collar 19 and a worm 20, said worm being fixed on a reduced end 21 of the tubular mold support 16. Meshing with the worm 20 is a worm wheel 22 mounted on the armature shaft 23 of an electric motor 24, said motor being mounted on a central enlargement 25 of the machine bed 4. This motor may be operated from a suitable source of electrical energy for driving the rotary tubular mold support 16, and the operation of the motor may be controlled by a conventional form of switch (not shown).

Mounted on the upper or outer end of the tubular mold support 16 is a detachable mold body 26 having a stepped recess 27 in which is mounted a detachable interchangeable mold shell 28. This shell has a longitudinal stepped bore with the outer end of said bore providing a mold cavity 29 adapted to receive plastic or molten material that may be distributed on the walls of the cavity by centrifugal force to form an article, and the bottom of the mold cavity has a beveled seat or wall 30 for a purpose that will hereinafter appear.

Fixed on the upper or forward ends of the reciprocatory rods 15 are the apertured ears 31 of a gate ring 32 and detachably mounted in said gate ring is an outer race member 33 provided with anti-frictional balls 34 supporting an inner race member 35 which is held in place by a retaining nut or ring 37 mounted on the inner race member and engaging the gate ring 32 and the outer race member 33.

Detachably mounted in the inner race member 35 is a gate or end mold 37 provided with a central opening 38 through which plastic or molten material may be poured. The inner face of the gate or end mold 37 is adapted to contact with the outer end face of the mold shell 28, as best shown in Figs. 4 and 7, and the inner and outer race members 35 and 33 respectively, have a configuration which permits of the gate or end mold member contacting with the mold shell, while the outer end of the mold body 26 is shaped to provide clearance for the inner race member 35. The inner face of the gate or end mold 37 may have an annular recess 39 of such configuration as to afford an end mold cavity in communication with the mold cavity 29 and adapted to form a collar, flange or offset portion 40 on an article 41 produced in the mold cavity 29.

Slidably mounted on the reciprocatory rods 15, contiguous to the set of guides 8, are the apertured ears 42 of a head 43 between the rods 15. The ears 42 normally engage abutments or stops 44 on the rods 15 and engaging said ears are coiled expansion springs 45 encircling the rods 15 and held against the ears 42 by adjustable end abutments or nuts 46 on reduced ends of the rods 15, which reduced ends are slidable in the guides 8. The springs 45 compensate for expansion and contraction between the mold and its gate and other parts of the machine.

Mounted in the head 43 are end thrust bearings 47 supporting a sleeve 48 and slidable in said sleeve is an ejector rod or plunger 49 provided with a head or nuts 50 against the end of the sleeve 48, so that the head 43 may retract the ejector rod or plunger 49. On this rod or plunger, adjacent the outer end of the sleeve 48 is an adjustable abutment 51 and after the head 43 has moved a predetermined distance relative to the ejector rod or plunger 49, the end of the sleeve 48 engages the abutment 51 and causes the head 43 and the ejector rod to move in synchronism. The abutment 51 is adjustable relative to the ejector rod or plunger 49 so that the ejector rod may be used in connection with mold shells of various lengths.

The upper or outer end of the ejector rod or plunger 49 is reduced, as at 52 so as to provide an annular chamber 53 within the tubular mold support 16 into which the ejector rod extends, and the reduced end of said ejector rod extends into the inner end of the mold shell 28 and is provided with an ejector head 54 normally on the seat 30 at the inner end of the mold cavity 29. The ejector head 54 normally closes and seals the inner end of the mold cavity and when the ejector rod or plunger 49 is distended or shifted outwardly relative to the mold support 16, the article 41 within the mold shell will be pushed and discharged therefrom. To prevent this article and others from being thrown about due to the centrifugal motion of the mold, a cylindrical guard 55 is placed about the upper or outer end of the mold body 26, as best shown in Figs. 2 and 3. The guard 55 may be conveniently made of sheet metal in two sections or halves having clamping flanges 56 engaging the rods 15 and held in engagement therewith by nut equipped bolts or screws 57. The lower section or half of the guard 55 has a discharge opening 58 which permits of articles dropping from the upper or outer end of the molding machine.

As previously mentioned, the reduced end 52 of the ejector rod or plunger 49 provides the annular chamber 53 in the mold support 16 and this annular chamber communicates with a plurality of radially disposed openings 59 and a circumferential groove 60 in the mold support 16. The groove 60 becomes an annular passage because of the bearing 13 and in said bearing is an air inlet port 61 communicating with a ported valve body 62 mounted in the lower face of the bearing 13. In the ported valve body 62 is a one-way conical ported valve plug 63 controlling communication between the port 61 of the bearing and an air supply pipe 64 connected to the valve body 62. The air supply pipe 64 may communicate with a suitable source of air, under pressure, and when the valve is opened the air may forcibly enter the port 61, groove 60, openings 59 and chamber 53. From this chamber the air is adapted to pass through longitudinal grooves 65 in the mold shell 28 about the reduced end 52 of the ejector rod or plunger 49, and with the ejector head 54 unseated or in a distended position, as shown in Fig. 2, the air produces a blast in the mold cavity 29 and blows therefrom any foreign matter, for instance graphitic flakes.

The air valve is of a conventional form and the plug 63 has its stem 66 provided with a slotted crank 67 into which extends a pin 68 carried by one of the rods 15, so that outward or forward movement of the reciprocatory rods 15 and the mold gate 37 will cause the air valve to be opened and admit a supply of air to the mold cavity 29 as the article 41 is ejected therefrom. Retraction of the mold gate to close the mold cavity causes the air valve to be closed.

The pedestal 9 supports an air cylinder 69 in proximity to the head 43 which has its upper wall flattened or cut away to provide clearance for the air cylinder. In the air cylinder 69 and protruding from ends thereof, is a piston rod 70 provided with a piston 71, said rod and piston being ported, as at 72 so that air may be admitted to the cylinder 69, at either side of the piston 71, to shift said piston and the rod 70 in a desired direction. The ported piston rod 70 extends through coupling members 73 provided with air conduits 74 adapted to communicate either with the atmosphere or a suitable supply of air, under pressure, and suitably controlled, so that air may be admitted to and exhausted from the air cylinder 69. The elements 69 to 74 inclusive are of a conventional form which permits of air under pressure being utilized for reciprocating the piston rod 70, and the upper or outer end of this piston rod is fixed to an arm 75 of the head 43, thus permitting of air under pressure being utilized as a prime mover, first for the rods 15, and then jointly for said rods and the ejector rod or plunger 49.

In operation, I will assume that the electric motor 24 is placed in operation and that the mold support 16, mold body 26 and mold shell 28 are revolved at a high rate of speed sufficient to centrifugally distribute plastic or molten material placed in the mold cavity 29. With the piston 70 in a retracted position, as shown in Fig. 1, the mold gate 37 is closed and the operator or attendant of the machine may ladle or otherwise gather a predetermined quantity of molten material, for instance, iron, and place the same in a mold cavity 29. The molten iron will be immediately thrown against the mold shell 29 and uniformly distributed on the walls of the mold shell to a thickness depending upon the quantity of the material placed in the mold, also the quality or nature of the material, since some materials become more dense than others on solidification while others may remain somewhat porous, and consequently provide walls of greater thickness than dense material. This takes place while the ejector rod or plunger 49 is in a retracted position causing the head 54 to form the bottom of the mold cavity 29, and when a sufficient period of time has elapsed for solidification of the molten metal, air can be admitted to the inner end of the cylinder 69 to shift the piston 70, arm 75 and head 43. Initial movement of the head 43 is independent of the ejector rod or plunger 49 and as the rods 15 are pushed outwardly by the head 43 the mold gate is opened to free said gate from the collar or offset portion 40 of the article 41, said mold gate and the mold shell being made of a refractory material to which molten metal will not freeze, although other materials may be used in the construction of the mold gate so long as articles can be ejected from the mold shell without unduly injuring the outer walls of such articles. As the initial movement of the mold gate takes place the head 43 approaches and eventually engages the abutment 51 of the ejector rod 49 and then said rod moves in unison with the rods 15. Projection of the ejector rod in the mold support 16 causes the ejector head 54 to shift the article 41 out of the mold shell into the guard 55 and from this guard through the opening 58 thereof to a receptacle or into the hands of the operator or attendant of the machine. As the ejection of the article takes place the air valve is automatically actuated to admit air to the mold shell, said mold shell being cooled and foreign matter discharged therefrom.

The supply of air to and from the air cylinder 69 may be controlled through the medium of a suitable pedal mechanism actuated by the operator or attendant of the machine so that his hands will be free for other duties and it is obvious that there may be a rest period or cessation in the production of articles without necessarily shutting down the motor which revolves the mold. When another article is to be reproduced it is necessary that air be admitted to the upper end of the cylinder 69 to retract the ejector rod 49, shut off the supply of air to the mold and close the mold gate, when a fresh batch of molten metal may be placed in the mold and another article produced.

It will be noted that when the mold gate is in a closed position it is free to revolve in synchronism with the rotary mold, by virtue of the anti-frictional bearing supporting the mold gate in the mold ring and the springs 45 will compensate for any expansion or contraction of the mold or mold gate, thus preventing the mold gate from sticking or jamming. The air admitted to the mold for cooling purposes also prevents sticking or jamming of the ejector rod or plunger 49, and since the mold shell is detachable it is obvious that other mold shells may be placed in the mold body to obtain articles of desired length, contour and weight.

I attach considerable importance to the angular adjustment of the machine relative to the base or frame as it is by this adjustment that I may regulate the distribution of molten metal in the rotary mold. This, together with speed regulation, and size of mold shell will determine the nature of the article to be produced and nature of the material that may enter into such article.

While in the drawings there is illustrated a preferred embodiment of my invention, it is to be understood that the structural elements are subjected to such changes in size, shape or manner of assembling as fall within the scope of the appended claims.

What I claim is:—

1. A centrifugal casting machine comprising a tiltable rotary mold, a gate movable to and from said mold, an article ejector in said mold, means for rotating said mold, means adapted for moving said gate and actuating said ejector, and means controlled by movement of said gate adapted to admit air under pressure to said mold for cooling and cleaning purposes.

2. In a centrifugal casting machine, rotary molds adapted to receive molten or plastic material therein and to be rotated whereby such material is subjected to centrifugal action which shapes the material in the mold;—a gate movable to and from a closed position with respect to each mold, an ejector movable in said mold, and gate operating means having said movement thereof, said means causing actuation of said ejector after said gate is partially removed.

3. A centrifugal casting machine as called for in claim 2, wherein said gate operating means is actuated by air under pressure and final movement of said gate is in synchronism with said ejector.

4. A centrifugal casting machine as called for in claim 2, wherein said gate is supported to be revolved by said mold when in a closed position.

5. In a centrifugal casting machine, a rotary mold adapted to receive molten or plastic material therein and to be rotated whereby such material is subjected to centrifugal action which shapes the material in the mold, an ejector movable in said mold, said means comprising an ejector head forming the bottom of said mold, and means reciprocating said ejector head.

6. In a centrifugal casting machine as called for in claim 5, cooling and cleansing means operable during the ejection of an article from said mold.

7. In a centrifugal casting machine as called for in claim 5, a guard about the outer end of said mold, said guard being adapted to receive articles discharged from said mold.

8. A centrifugal casting machine comprising a driven rotary mold support, a mold body on said support, an interchangeable mold shell in said mold body in which material may be moulded by rotation of said mold body subjecting the material to centrifugal action, an ejector rod extending through said mold support into said mold shell, a head on said rod forming the bottom of a mold cavity in said mold shell, means at the inner end of said mold support adapted for reciprocating said ejector rod to cause a moulded article to be discharged from said mold shell, and means actuated in synchronism with the ejection of an article from said mold shell adapted to admit air under pressure thereto for cooling and cleaning purposes.

9. A centrifugal casting machine comprising a driven rotary mold support normally disposed at an angle to the horizontal, a mold on the outer end of said support in which mold material may be moulded by rotation of said mold subjecting the material to centrifugal action, a gate movable to and from said mold, a head adapted for moving said gate, an article ejector slidable in said mold support, said mold and said head, and adapted to be shifted by said head, and means adapted to move said head, said gate being initially shifted in advance of said ejector and then in synchronism therewith.

10. A centrifugal casting machine comprising a driven rotary mold support normally disposed at an angle to the horizontal, a mold on the outer end of said support in which mold material may be moulded by rotation of said mold subjecting the material to centrifugal action, a movable gate for said mold, an article ejector slidable in said mold support and said mold, a valve controlling a supply of air to said mold for cooling and cleaning purposes, and means adapted for simultaneously moving said gate, sliding said ejector and adjusting said valve.

11. In a casting machine, a mold body, a mold shell detachably mounted in said body, an ejector extending into said mold shell and forming the bottom of a mold cavity in said shell, an air valve communicating with said mold shell and adapted to admit air to said mold shell, for cooling and cleaning purposes, and means adapted to simultaneously adjust said air valve and said ejector.

12. A casting machine as called for in claim 11, and a rotary tubular support for said mold body and through which said support and said ejector extends and air passes to said mold shell.

In testimony whereof I affix my signature in presence of two witnesses.

BENJAMIN NOBLE.

Witnesses:
OTTO F. BARTHEL,
KARL H. BUTLER.